(12) United States Patent
Suzuki et al.

(10) Patent No.: US 10,151,990 B2
(45) Date of Patent: Dec. 11, 2018

(54) TONER

(71) Applicant: CANON KABUSHIKI KAISHA, Tokyo (JP)

(72) Inventors: Masao Suzuki, Kawasaki (JP); Kazuyuki Sato, Yokohama (JP); Shohei Fukuya, Tokyo (JP); Atsushi Nakamoto, Tokyo (JP); Makoto Fukatsu, Suntou-gun (JP); Takahiro Kawamoto, Yokohama (JP); Maki Okajima, Kawasaki (JP); Masayoshi Kato, Tokyo (JP); Yasunori Chigono, Kashiwa (JP); Takeshi Yamamoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/814,818

(22) Filed: Nov. 16, 2017

(65) Prior Publication Data

US 2018/0149989 A1    May 31, 2018

(30) Foreign Application Priority Data

Nov. 25, 2016 (JP) .................................. 2016-228880
Oct. 19, 2017 (JP) .................................. 2017-202917

(51) Int. Cl.
| | | |
|---|---|---|
| *G03G 9/087* | (2006.01) | |
| *C08L 23/00* | (2006.01) | |
| *C08L 25/06* | (2006.01) | |
| *G03G 9/08* | (2006.01) | |
| *C08F 287/00* | (2006.01) | |

(52) U.S. Cl.
CPC ....... *G03G 9/08708* (2013.01); *C08F 287/00* (2013.01); *C08L 23/00* (2013.01); *C08L 25/06* (2013.01); *G03G 9/0819* (2013.01); *G03G 9/0821* (2013.01); *G03G 9/08797* (2013.01); *C08L 2207/04* (2013.01)

(58) Field of Classification Search
CPC .......... G03G 9/08755; G03G 9/08764; G03G 9/08708; G03G 9/09321
See application file for complete search history.

(56) References Cited

U.S. PATENT DOCUMENTS

| | | |
|---|---|---|
| 4,802,977 A | 2/1989 | Kanda et al. |
| 4,844,349 A | 7/1989 | Kanda et al. |

(Continued)

FOREIGN PATENT DOCUMENTS

| | | |
|---|---|---|
| JP | S55-018654 A | 2/1980 |
| JP | H10-161344 A | 6/1998 |

(Continued)

*Primary Examiner* — Peter L Vajda
(74) *Attorney, Agent, or Firm* — Fitzpatrick Cella Harper and Scinto

(57) ABSTRACT

A toner comprising a toner particle that contains a binder resin, wherein the surface of the toner particle is covered with a resin A; the modulus of elasticity Ea of the resin A and the modulus of elasticity Eb of the binder resin satisfy the following formula:

$0.5 \leq (Ea/Eb) \times 100 \leq 50.0$; and the adhesion force $A_T$ of the toner particle is at least 500 nN when a probe having spherical $SiO_2$ attached at the tip of a cantilever is pressed into the toner particle at 3 µN.

4 Claims, 2 Drawing Sheets

(56) References Cited

U.S. PATENT DOCUMENTS

| | | |
|---|---|---|
| 5,016,823 A | 5/1991 | Kato et al. |
| 5,111,998 A | 5/1992 | Kanda et al. |
| 5,270,143 A | 12/1993 | Tomiyama et al. |
| 5,338,638 A | 8/1994 | Tsuchiya et al. |
| 5,364,720 A | 11/1994 | Nakazawa et al. |
| 5,424,810 A | 6/1995 | Tomiyama et al. |
| 5,447,815 A | 9/1995 | Kato et al. |
| 5,489,498 A | 2/1996 | Ohno et al. |
| 5,712,075 A | 1/1998 | Mitsumura et al. |
| 5,753,396 A | 5/1998 | Nakamura et al. |
| 6,207,339 B1 | 3/2001 | Kato et al. |
| 7,264,910 B2 | 9/2007 | Toyoda et al. |
| 7,767,370 B2 | 8/2010 | Ishigami et al. |
| 7,833,685 B2 | 11/2010 | Tanaka et al. |
| 7,833,687 B2 | 11/2010 | Kato et al. |
| 7,877,030 B2 | 1/2011 | Horie et al. |
| 8,211,606 B2 | 7/2012 | Murai et al. |
| 8,697,327 B2 | 4/2014 | Shibata et al. |
| 8,835,089 B2 | 9/2014 | Hagiwara et al. |
| 9,594,320 B2 | 3/2017 | Fukatsu et al. |
| 2005/0209364 A1 | 9/2005 | Yamagishi et al. |
| 2008/0299482 A1 | 12/2008 | Kato et al. |
| 2010/0035171 A1 | 2/2010 | Watanabe et al. |
| 2010/0183971 A1 | 7/2010 | Fujikawa et al. |
| 2012/0156604 A1 | 6/2012 | Fukatsu et al. |
| 2013/0108955 A1 | 5/2013 | Shibata et al. |
| 2013/0202998 A1 | 8/2013 | Higashi et al. |
| 2014/0030648 A1* | 1/2014 | Miyamoto ......... G03G 9/09321 430/110.2 |
| 2015/0212440 A1 | 7/2015 | Ozawa et al. |
| 2016/0334724 A1 | 11/2016 | Fukatsu et al. |

FOREIGN PATENT DOCUMENTS

| | | |
|---|---|---|
| JP | 2002-318467 A | 10/2002 |
| JP | 2014-041339 A | 3/2014 |
| JP | 2015-141222 A | 8/2015 |

* cited by examiner

TONER

BACKGROUND OF THE INVENTION

Field of the Invention

The present invention relates to a toner used in an image-forming apparatus that forms an image on a recording medium.

Description of the Related Art

Additional increases in image quality and speed and greater energy savings have been required in recent years of copiers and printers that use electrophotographic systems. This has been accompanied by increasing levels of stress applied to the toner within the apparatus, and toner is required that has an ever greater stress resistance and can maintain a high transfer efficiency on a long-term basis.

However, the stress applied at, for example, the developing device and so forth, commonly causes the toner to collapse, causes the external additive fine particles on the toner surface to become buried in the toner, and/or causes the external additive fine particles to migrate from the toner surface to members such as the developing roller and photosensitive member. As a result, the toner-to-toner aggregative forces and the adhesion force of the toner to various members such as the developing roller and photosensitive member undergo an increase and the transfer efficiency ends up declining as the number of prints increases. When, in particular, small-size external additive fine particles are used, burying is facilitated and the toner particle-to-toner particle spacer effect and the spacer effect versus members then cannot be maintained and a toner having a weak stress resistance ends up being generated.

Within the context of long-term maintenance of the spacer effect, the attempt is made in Japanese Patent Application Laid-open No. 2002-318467 to use large-size external additive fine particles in combination with small-size external additive fine particles.

In addition, from the standpoint of energy savings, the realization is desired of a toner that, by rapidly melting at lower temperatures than previously, can undergo fixing quickly and with less energy. Due to this, Japanese Patent Application Laid-open No. H10-161344 proposes a toner that can undergo fixing at lower temperatures as a result of shifting the molecular weight distribution of the binder resin to the lower molecular weight side than before and/or as a result of adding a plasticizer to the binder resin.

On the other hand, Japanese Patent Application Laid-open No. 2014-041339 proposes a core-shell toner that has an ethylene/unsaturated carboxylic acid copolymer at the interface between the core and shell layer.

As an invention that improves the stress resistance of toners, Japanese Patent Application Laid-open No. S55-018654 proposes a pressure-fixable toner in which a core particle is coated with a cyclized rubber.

SUMMARY OF THE INVENTION

However, with the toner described in Japanese Patent Application Laid-open No. 2002-318467, while the large-size external additive fine particles are resistant to burying in the toner particle, they readily migrate from the toner particle surface to various members, and there is thus room for improvement here with regard to the long-term maintenance of the stress resistance.

With the toner described in Japanese Patent Application Laid-open No. H10-161344, the toner does have the ability to undergo fixing at low temperatures, but at the same time it is brittle and its stress resistance is prone to decline and problems have occurred in that the toner in the developing device collapses as the number of prints increases and the small-size external additive fine particles are more easily buried in the toner particle during long-term use.

The toner described in Japanese Patent Application Laid-open No. 2014-041339 does provide a long-term suppression of the fracture of the toner particle surface layer that occurs based on interfacial separation between the core and shell layer; however, there is room for improvement with regard to simultaneously solving the problems of suppressing the migration of large-size external additive fine particles and suppressing the collapse occurring in the toner particle interior and burying of the external additive fine particles.

While the stress resistance is improved with the toner described in Japanese Patent Application Laid-open No. S55-018654, its lack of thermoplasticity strongly impedes achieving the energy conservation deriving from an improved low-temperature fixability and higher speeds that are required of toners that undergo fixing by the application of heat and pressure.

An object of the present invention is to provide a toner that, while retaining its low-temperature fixability, resists the occurrence of toner collapse even during long-term use, resists the occurrence of burying of the external additive fine particles and the occurrence of migration by the external additive fine particles to members such as the developing roller and photosensitive member, and can maintain a high transfer efficiency on a long-term basis.

The present invention relates to a toner comprising a toner particle that contains a binder resin, wherein the surface of the toner particle is covered with a resin A; the modulus of elasticity Ea of the resin A and the modulus of elasticity Eb of the binder resin satisfy the following formula:

$$0.5 \leq (Ea/Eb) \times 100\ [\%] 50.0;\ \text{and}$$

the adhesion force $A_T$ of the toner particle is at least 500 nN when a probe having spherical $SiO_2$ attached at the tip of a cantilever has been pressed into the toner particle at 3 µN.

The present invention can thus provide a toner that, while retaining its low-temperature fixability, resists the occurrence of toner collapse even during long-term use, resists the occurrence of burying of the external additive fine particles and the occurrence of migration by the external additive fine particles to members such as the developing roller and photosensitive member, and can maintain a high transfer efficiency on a long-term basis.

Further features of the present invention will become apparent from the following description of exemplary embodiments with reference to the attached drawings.

DESCRIPTION OF THE EMBODIMENTS

Figure 1:
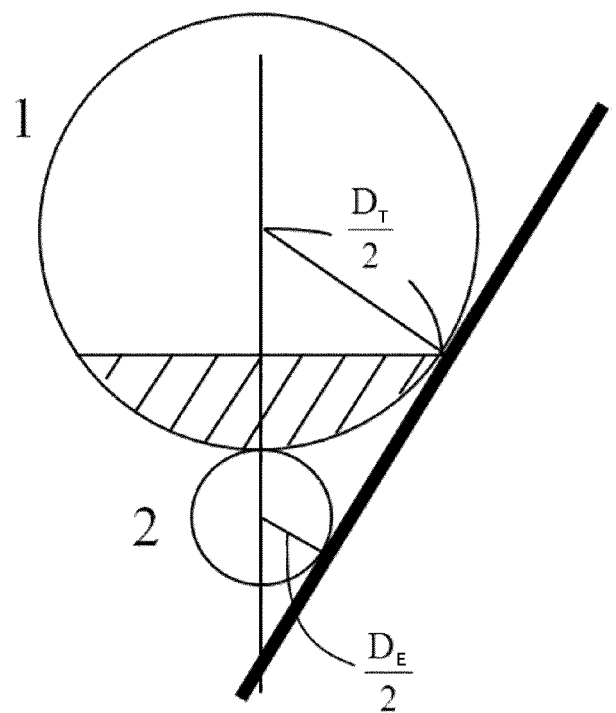
FIG. 1 is a schematic diagram of a toner particle and a fine particle present on the surface of the toner particle.

Unless specifically indicated otherwise, phrases such as "at least XX and not more than YY" and "XX to YY" that indicate numerical value ranges in the present invention mean that the numerical value ranges include the lower limit and upper limit that are the endpoints.

Embodiments of the present invention are described in the following.

<The Toner Particle>

The present invention is a toner comprising a toner particle that contains a binder resin, wherein the surface of the toner particle is covered with a resin A; the modulus of elasticity Ea of the resin A and the modulus of elasticity Eb of the binder resin satisfy the following formula:

$$0.5 \leq (Ea/Eb) \times 100 \leq 50.0; \text{ and}$$

the adhesion force $A_T$ of the toner particle is at least 500 nN when a probe having spherical $SiO_2$ attached at the tip of a cantilever has been pressed into the toner particle at 3 μN. The present inventors discovered that the use of a toner having these characteristic features makes it possible to provide a very durable toner that resists the occurrence of toner collapse even during long-term use and that resists the occurrence of burying of the external additive fine particles and the occurrence of migration to members by the external additive fine particles.

The following is hypothesized as to the reasons why these effects are obtained.

Thus, by having the toner have the constitution indicated above, when stress is applied the stress readily concentrates in the surface resin having a relatively low modulus of elasticity, and due to this stress relaxation can occur through deformation and heating of the surface resin and the action of the stress on the interior of the toner particle is then inhibited. It is thought that toner collapse can be inhibited as a result.

In addition, it is thought that, by having the low-elastic modulus resin A be present at the toner particle surface, the adhesiveness of the toner particle surface is raised and the migration to members by the external additive can then be inhibited. A cause of the increase in adhesiveness is thought to reside in an increase in the area of contact between the external additive fine particles and the resin A covering the toner particle surface. Accordingly, by having the resin A, which has a modulus of elasticity lower than that of the binder resin, be present at the surface, the area of contact between the surface resin A and the external additive fine particles is increased when stress is received, and it is hypothesized that, due to this, the external additive fine particles are confined to the toner particle surface without migrating to members.

It is thought that as a result, migration to members by the external additive particles, which function as a flowability improver for the toner and as a spacer, is suppressed and it becomes possible to maintain a high transfer efficiency on a long-term basis.

Thus, as long as the modulus of elasticity Eb of the binder resin and the modulus of elasticity Ea of the resin A satisfy the formula given below, there are otherwise no particular limitations on the resin A that covers the toner particle surface in the present invention. (Ea/Eb)×100 is more preferably at least 1.0% and not more than 40.0%.

$$0.5 \leq (Ea/Eb) \times 100 \, [\%] \leq 50.0$$

A resin A (referred to below as the covering resin) having a modulus of elasticity Ea of not more than 1.0 GPa is preferred. Such a resin A can be exemplified by gel materials; rubber materials as typified by urethane rubbers, silicone rubbers, fluororubbers, and so forth; and thermoplastic elastomers. Moreover, from the standpoint of suppressing changes in the surface condition of the toner, rubber materials and thermoplastic elastomers, which are flexible and exhibit elastic recovery, are preferred, while thermoplastic elastomers are more preferred from the standpoint of the low-temperature fixability.

When the adhesion force $A_T$ of the toner is less than 500 nN, the area of contact between the toner particle surface and the external additive fine particles is restrained and the aforementioned effects cannot be obtained. The adhesion force $A_T$ of the toner is preferably at least 600 nN. When the adhesion force $A_T$ of the toner is at least 600 nN, even when fine particles of at least 0.090 μm (also referred to as large-size external additive fine particles), which exhibit the spacer effect, are used, migration to members by the large-size external additive fine particles can be inhibited and a high transfer efficiency can be maintained on a long-term basis. The upper limit on the adhesion force $A_T$ of the toner is not particularly limited, but is preferably not more than 2,000 nN and is more preferably not more than 1,500 nN.

The adhesion force $A_T$ of the toner can be increased by techniques such as, for example, lowering the modulus of elasticity Ea of the resin A and raising the ratio of coverage by the resin A. The details are given below.

The toner particle can be produced by various known production methods.

An example is the suspension polymerization method, in which the covering resin (resin A) and optional additives such as colorant and wax are dispersed or dissolved in polymerizable monomer to prepare an oil phase; the oil phase is granulated in an aqueous medium under the application of shear; and the toner particle is obtained by carrying out a polymerization reaction.

Another example is the dissolution suspension method, in which the covering resin (resin A), binder resin, and optional additives such as colorant and wax are dissolved or dispersed with mixing in an organic solvent; granulation is carried out in an aqueous medium; and the solvent is then removed to obtain the toner particle.

Another example is the emulsion aggregation method. Here, fine particles of each of the binder resin and optionally colorant, wax, and so forth, are finely dispersed in aqueous media and these are mixed; an aggregating agent is added to the aqueous medium to induce aggregation to the size of the toner; and heating and coalescence are carried out to obtain an aqueous dispersion of a toner core particle. This is followed by the addition, to the aqueous dispersion of the toner core particle, of a dispersion of fine particles of the covering resin (resin A) and attachment to the core surface and heating and coalescence to obtain the toner particle.

Two or more of these production methods may also be combined. For example, a toner base particle produced by a pulverization method or suspension polymerization method may be redispersed in an aqueous medium using, for example, a surfactant. After mixing into this a dispersion of fine particles of a resin containing the covering resin (resin A), the toner particle can be produced by, for instance, aggregating and attaching these fine particles to the surface of the toner base particle using the emulsion aggregation method.

When the toner particle is produced by the suspension polymerization method, the oil phase may be prepared by mixing the covering resin (resin A), polymerizable monomer that can produce the binder resin, and optional colorant, wax, polymerization initiator, and so forth; this oil phase may be dispersed in an aqueous medium by the application of shear and granulated into oil phase particles; and the toner particle may then be produced by polymerizing the polymerizable monomer in the oil phase particles in the aqueous medium.

When toner particle production is carried out by the suspension polymerization method, the covering resin preferably has the ester bond or a hydrophilic polar group, e.g., the amino group, carboxy group, hydroxyl group, and so forth, because this facilitates segregation of the covering resin to the toner particle surface; however, this is not necessarily a limitation due to dependence also on the type of polymerizable monomer used.

In addition, as indicated above, the toner particle according to the present invention can also be produced by producing a toner base particle not incorporating the covering resin (resin A) using, for example, the suspension polymerization method, followed by attaching fine particles of the covering resin to the toner base particle surface and coalescence using, for example, the emulsion aggregation method described below.

When the toner particle is produced by the suspension polymerization method, the covering resin particles may also be attached to the toner base particle surface through the use of a solid dispersing agent or ionic surfactant capable of imparting charge to a surface. That is, the toner particle may also be produced by electrostatic attachment, either of the fine particles obtained by preparing a dispersion of the covering resin fine particles by carrying out a forced emulsification using an ionic surfactant having a charge of opposite polarity from that of the toner base particle surface, or using a self-emulsified dispersion of the covering resin fine particles when the covering resin bears an ionic functional group.

In this case, there are no particular limitations on the method for producing the dispersion of the covering resin fine particles, and production can be carried out using known methods, for example, phase inversion emulsification or reprecipitation. In phase inversion emulsification, a covering resin fine particle dispersion can be produced by preparing a dispersion by adding, with stirring or under high shear, an aqueous ionic surfactant solution to a solution of the covering resin dissolved in an organic solvent, and by then removing the solvent. When a covering resin having an ionic functional group, i.e., the carboxy group or amino group, is used, a covering resin fine particle dispersion can be prepared in the form of a self-emulsified dispersion—without using a surfactant and also depending on the concentration of the ionic functional groups—by adding, with stirring or under high shear, an alkaline or acidic aqueous solution as a neutralizing agent for the ionic functional groups. Production may also be carried out using an ionic surfactant in combination with a neutralizing agent.

The polymerization initiator used in the suspension polymerization method can be exemplified by known polymerization initiators, for example, azo compounds, organic peroxides, inorganic peroxides, organometal compounds, and photopolymerization initiators. A single polymerization initiator may be used by itself or two or more may be used in combination.

The aqueous medium used in the suspension polymerization method preferably contains a dispersion stabilizer. A known inorganic or organic dispersion stabilizer can be used as this dispersion stabilizer.

The inorganic dispersion stabilizers can be exemplified by calcium phosphate, magnesium phosphate, aluminum phosphate, zinc phosphate, magnesium carbonate, calcium carbonate, calcium hydroxide, magnesium hydroxide, aluminum hydroxide, calcium metasilicate, calcium sulfate, barium sulfate, bentonite, silica, and alumina.

The organic dispersion stabilizers can be exemplified by polyvinyl alcohol, gelatin, methyl cellulose, methyl hydroxypropyl cellulose, ethyl cellulose, the sodium salt of carboxymethyl cellulose, and starch.

Among these dispersion stabilizers, the use of an acid-soluble, sparingly water-soluble inorganic dispersion stabilizer is preferred from the standpoints of the ability to control the particle size distribution and the removability by washing.

The method comprising the following steps is an example of toner particle production by the emulsion aggregation method. Thus, the toner particle can be obtained by proceeding through the following: a step of preparing aqueous dispersions of the constituent components of the toner particle, i.e., the covering resin (resin A), binder resin, and optional additives such as colorant and wax (dispersion step); a step of mixing these dispersions followed by aggregation to form an aggregate particle (aggregation step); a step of heating and coalescing this aggregate particle (coalescence step); a washing step; and a drying step.

In the aggregation step in a method preferred for the present invention, an aggregate is formed of the substances other than the covering resin followed by the addition of an aqueous dispersion of the covering resin, formation of an aggregate particle, and coalescence. In another preferred method, fine particles other than those of the covering resin are aggregated/coalesced, followed by the addition of an aqueous dispersion of the covering resin and attachment to the toner base particle surface and coalescence. The state of occurrence of the covering resin can be advantageously controlled using these methods.

An ionic surfactant can be used in the dispersion step for the various toner constituent components. The aqueous dispersion can be prepared by a known method; for example, with regard to the binder resin and covering resin, production can be carried out by the phase inversion emulsification described above. With regard to the colorant, production can be carried out by subjecting the mixture with an aqueous ionic surfactant solution to high shear using a high-speed rotational homogenizer or a disperser based on, for example, high-pressure counter-collision. With regard to the wax, production may also be carried out using phase inversion emulsification or the same procedures as indicated for the colorant.

There are no particular limitations on the ionic surfactant, but ionic surfactants that in particular facilitate conversion to fine particles and provide a high dispersity and a high stability are preferred. Anionic surfactants and anionic polyelectrolytes are preferred from the standpoint of the ability to control aggregation, while ionic surfactants are more preferred from the standpoint of the washability.

There are no particular limitations on the method for forming the aggregate particle; however, a pH modifier or aggregating agent may be added to and mixed with the aqueous dispersion mixture and control may be exercised using, for example, the temperature and mechanical force (stirring).

<Binder Resin>

Known binder resins can be used as the binder resin; for example, vinyl resins such as styrene-acrylic resins and polyester resins and hybrid resins provided by their bonding can be used.

The polymerizable monomers that form these are used in the methods of directly obtaining toner particles by polymerization, and these polymerizable monomers can be exemplified by the following.

Specifically, the following are preferably used: styrene and styrenic monomers such as o-methylstyrene, m-methylstyrene, p-methylstyrene, o-ethylstyrene, m-ethylstyrene, and p-ethylstyrene; acrylic acid and acrylate monomers such as methyl acrylate, ethyl acrylate, propyl acrylate, butyl acrylate, octyl acrylate, dodecyl acrylate, stearyl acrylate, behenyl acrylate, 2-ethylhexyl acrylate, dimethylaminoethyl acrylate, diethylaminoethyl acrylate, acrylonitrile, and acrylamide; methacrylic acid and methacrylate monomers such as methyl methacrylate, ethyl methacrylate, propyl methacrylate, butyl methacrylate, octyl methacrylate, dodecyl methacrylate, stearyl methacrylate, behenyl methacrylate, 2-ethylhexyl methacrylate, dimethylaminoethyl methacrylate, diethylaminoethyl methacrylate, methacrylonitrile, and methacrylamide; and olefinic monomers such as butadiene, isoprene, and cyclohexene. Two or more of these polymerizable monomers may also be used in combination.

A crosslinking agent may also be used during binder resin synthesis in order to raise the mechanical strength of the toner particle and control the molecular weight of the binder resin.

The crosslinking agent can be exemplified by the following.

Difunctional crosslinking agents can be exemplified by divinylbenzene, 2,2-bis(4-acryloxyethoxyphenyl)propane, 2,2-bis(4-methacryloxyphenyl)propane, diallyl phthalate, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, the diacrylate of each of polyethylene glycol #200, #400, and #600, dipropylene glycol diacrylate, polypropylene glycol diacrylate, and polyester-type diacrylates and difunctional crosslinking agents provided by replacing the diacrylate in the preceding with dimethacrylate.

Trifunctional and higher functional crosslinking agents can be exemplified by pentaerythritol triacrylate, trimethylolethane triacrylate, trimethylolpropane triacrylate, tetramethylolmethane tetraacrylate, oligoester acrylate, and trifunctional and higher functional crosslinking agents provided by changing the acrylate in the preceding to methacrylate, and also by triallyl cyanurate, triallyl isocyanurate, and triallyl trimellitate.

Considered from the standpoint of the fixing performance and offset resistance of the toner, the use amount for these crosslinking agents, per 100.0 mass parts of the polymerizable monomer that can produce the binder resin, is preferably at least 0.05 mass parts and not more than 10.0 mass parts and is more preferably at least 0.1 mass parts and not more than 5.0 mass parts.

There are also no particular limitations on the constituent monomer when a polyester resin is used as the binder resin. For example, polyhydric alcohols (dihydric and trihydric and higher hydric alcohols) and polybasic carboxylic acids (dibasic and tribasic and higher basic carboxylic acids) and their anhydrides and lower alkyl esters can be used. Here, a partial crosslinking within the binder resin molecule is effective for producing a crosslinked polymer, and the use is preferred for this of a trivalent or higher multifunctional valent compound (trihydric and higher hydric alcohols or tribasic and higher basic carboxylic acids). Accordingly, the starting monomer for the polyester preferably includes a tribasic or higher basic carboxylic acid or an anhydride or lower alkyl ester thereof, and/or a trihydric or higher hydric alcohol.

The following polyhydric alcohol monomers can be used as the alcohol monomer.

The dihydric alcohol component can be exemplified by ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A, bisphenols given by formula (A) and derivatives thereof, and diols given by formula (B).

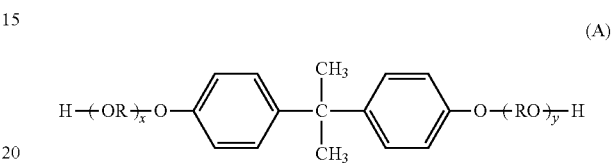

(A)

In the formula, R is an ethylene or propylene group; x and y are each integers equal to or greater than 0; and the average value of x+y is at least 0 and not more than 10.

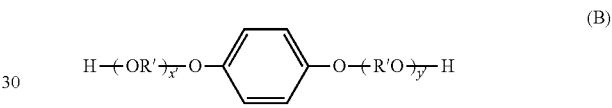

(B)

In the formula, R' is

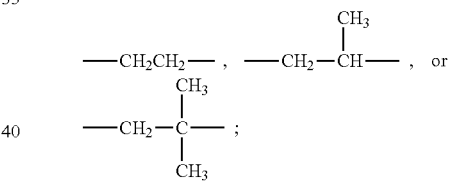

x' and y' are each integers equal to or greater than 0; and the average value of x'+y' is 0 to 10.

The trihydric and higher hydric alcohol component can be exemplified by sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene. Among these, the use of glycerol, trimethylolpropane, and pentaerythritol is preferred. Two or more of these dihydric alcohols may be used in combination, and two or more of these trihydric and higher hydric alcohols may be used in combination.

The following polybasic carboxylic acid monomers can be used as the carboxylic acid monomer for producing the polyester resin.

The dibasic carboxylic acid component can be exemplified by maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isododecenylsuccinic acid, n-dodecylsuccinic acid, isododecylsuccinic acid, n-octenylsuccinic acid, n-octylsuccinic acid, isooctenylsuccinic acid, and isooctylsuccinic acid and anhydrides of these acids and lower alkyl esters of these acids. Among the preceding, the use is preferred of maleic acid, fumaric acid, terephthalic acid, and n-dodecenylsuccinic acid.

The tribasic and higher basic carboxylic acids and their anhydrides and lower alkyl esters can be exemplified by 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, trimellitic acid, and Empol trimer acid and their anhydrides and lower alkyl esters.

Among the preceding, the use in particular of 1,2,4-benzenetricarboxylic acid, i.e., trimellitic acid, or a derivative thereof is preferred because it is inexpensive and its reaction is easily controlled. Two or more dibasic carboxylic acids may be used in combination and two or more tribasic or higher basic carboxylic acids may be used in combination.

When a polyester resin is the main component for the binder resin, a hybrid resin containing another resin component may also be used. An example here is a hybrid resin of a polyester resin and a vinyl resin. In a preferred method for obtaining the reaction product of a polyester resin with a vinyl resin or vinyl copolymer unit as the hybrid resin, the polymerization reaction of either one of the resins or both resins is run in the presence of a polymer containing a monomer component capable of reacting with each of a vinyl resin or vinyl copolymer unit and a polyester resin.

The acid value of the binder resin is preferably at least 1.0 mg KOH/g and not more than 35.0 mg KOH/g. When the acid value of the binder resin is in this range, an excellent quantity of charge is obtained both in a high-humidity environment and a low-humidity environment. The acid value is the number of milligrams of potassium hydroxide required to neutralize, e.g., the free fatty acid, resin acid, and so forth, present in 1.0 g of a sample. Measurement is carried out according to JIS-K0070 for the measurement method.

<Wax>

A wax may be used in the toner particle. The following are examples of this wax: hydrocarbon waxes such as low molecular weight polyethylene, low molecular weight polypropylene, alkylene copolymers, microcrystalline wax, paraffin wax, and Fischer-Tropsch waxes; oxides of hydrocarbon waxes, such as oxidized polyethylene wax, and their block copolymers; waxes in which the major component is fatty acid ester, such as carnauba wax; and waxes provided by the partial or complete deacidification of fatty acid esters, such as deacidified carnauba wax. Additional examples are as follows:

saturated straight-chain fatty acids such as palmitic acid, stearic acid, and montanic acid; unsaturated fatty acids such as brassidic acid, eleostearic acid, and parinaric acid; saturated alcohols such as stearyl alcohol, aralkyl alcohols, behenyl alcohol, carnaubyl alcohol, ceryl alcohol, and melissyl alcohol; polyhydric alcohols such as sorbitol; fatty acids such as palmitic acid, stearic acid, behenic acid, and montanic acid; esters with alcohols such as stearyl alcohol, aralkyl alcohol, behenyl alcohol, carnaubyl alcohol, ceryl alcohol, and melissyl alcohol; fatty acid amides such as linoleamide, oleamide, and lauramide; saturated fatty acid bisamides such as methylenebisstearamide, ethylenebiscapramide, ethylenebislauramide, and hexamethylenebisstearamide; unsaturated fatty acid amides such as ethylenebisoleamide, hexamethylenebisoleamide, N,N'-dioleyladipamide, and N,N'-dioleylsebacamide; aromatic bisamides such as m-xylenebisstearamide and N,N'-distearylisophthalamide; fatty acid metal salts (generally known as metal soaps) such as calcium stearate, calcium laurate, zinc stearate, and magnesium stearate; waxes provided by grafting an aliphatic hydrocarbon wax using a vinyl monomer such as styrene or acrylic acid; partial esters between a polyhydric alcohol and a fatty acid, such as behenic monoglyceride; and hydroxyl group-containing methyl ester compounds obtained by the hydrogenation of plant oils.

Hydrocarbon waxes such as paraffin wax and Fischer-Tropsch wax and fatty acid ester waxes such as carnaubyl wax are preferred among the preceding waxes from the standpoint of bringing about an enhanced low-temperature fixability and hot offset resistance.

The wax content is preferably at least 1.0 mass parts and not more than 20.0 mass parts per 100 mass parts of the binder resin.

The peak temperature of the maximum endothermic peak for the wax in the endothermic curve measured during heating using a differential scanning calorimeter (DSC) is preferably at least 45° C. and not more than 140° C. The peak temperature of the maximum endothermic peak of the wax is preferably in the indicated temperature range because this enables the storage stability of the toner to coexist with its hot offset resistance.

<Colorant>

A colorant may be used in the toner particle. The colorant can be exemplified by the following.

Black colorants can be exemplified by carbon black and by black colorants provided by color mixing using a yellow colorant, magenta colorant, and cyan colorant to yield a black color. A pigment may be used by itself for the colorant or may be used in combination with a dye.

Pigments for magenta toners can be exemplified by the following: C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, and 282; C. I. Pigment Violet 19; and C. I. Vat Red 1, 2, 10, 13, 15, 23, 29, and 35.

Dyes for magenta toners can be exemplified by the following: oil-soluble dyes such as C. I. Solvent Red 1, 3, 8, 23, 24, 25, 27, 30, 49, 81, 82, 83, 84, 100, 109, and 121; C. I. Disperse Red 9, C. I. Solvent Violet 8, 13, 14, 21, and 27, and C. I. Disperse Violet 1; and basic dyes such as C. I. Basic Red 1, 2, 9, 12, 13, 14, 15, 17, 18, 22, 23, 24, 27, 29, 32, 34, 35, 36, 37, 38, 39, and 40, and C. I. Basic Violet 1, 3, 7, 10, 14, 15, 21, 25, 26, 27, and 28.

Pigments for cyan toners can be exemplified by the following: C. I. Pigment Blue 2, 3, 15:2, 15:3, 15:4, 16, and 17; C. I. Vat Blue 6; C. I. Acid Blue 45; and copper phthalocyanine pigments having 1 to 5 phthalimidomethyl groups substituted on the phthalocyanine skeleton.

C. I. Solvent Blue 70 is an example of a dye for cyan toners.

Pigments for yellow toners can be exemplified by the following: C. I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, and 185; and C. I. Vat Yellow 1, 3, and 20.

C. I. Solvent Yellow 162 is an example of a dye for yellow toners.

The colorant content is preferably at least 0.1 mass parts and not more than 30 mass parts per 100 mass parts of the binder resin.

<Charge Control Agent>

The toner particle may optionally also contain a charge control agent.

Negative-charging charge control agents can be exemplified by metal naphthoate compounds, metal dicarboxylate compounds, polymeric compounds having sulfonic acid or carboxylic acid in side chain position, polymeric compounds having sulfonate salt or sulfonate ester in side chain position, polymeric compounds having carboxylate salt or carboxylate ester in side chain position, boron compounds, urea compounds, silicon compounds, and calixarene.

The positive-charging charge control agents can be exemplified by quaternary ammonium salts, polymeric compounds having a quaternary ammonium salt in side chain position, guanidine compounds, and imidazole compounds. The charge control agent may be internally added to the toner particle in, for example, the pulverization method or suspension polymerization method, or may be externally added after the toner particle has been produced, including by other production methods. The content of the charge control agent is preferably at least 0.2 mass parts and not more than 10 mass parts per 100 mass parts of the binder resin.

<Resin A (Covering Resin)>

As previously indicated, a thermoplastic elastomer is preferred for the covering resin in the present invention. The state of coverage may take the form of a coating film or may have a particulate form or may be a state intermediate therebetween and is not particularly limited.

There are no particular limitations on the type of thermoplastic elastomer as long as it enables control of the ratio of coverage and the state of coverage as above and enables $A_T$ to be controlled to at least 500 nN. Specifically, a known thermoplastic elastomer can be used, for example, a polystyrenic thermoplastic elastomer, polyolefinic thermoplastic elastomer, polybutadiene thermoplastic elastomer, polyamide thermoplastic elastomer, polyurethane thermoplastic elastomer, polyester thermoplastic elastomer, and their modifications.

Among these thermoplastic elastomers, a polyolefinic thermoplastic elastomer having hydrophilic group, polystyrenic thermoplastic elastomer, or modification thereof is preferred from the standpoint of the low-temperature fixability and the environmental stability of the transfer efficiency. Two or more of these thermoplastic elastomers may be used in combination, and other low molecular weight compounds and resins other than thermoplastic elastomers may be used in combination with the thermoplastic elastomer as long as the modulus of elasticity Ea is not more than 1.0 GPa. However, from the standpoint of the storage stability, the lower limit for Ea is preferably at least 0.005 GPa (5.0 MPa).

The ratio of coverage by resin A on the toner particle surface is at least 70% from the standpoint of suppressing toner collapse on a long-term basis. When this range is observed with the use of small-size external additive fine particles and with the use of large-size external additive fine particles, it then also becomes possible to inhibit burying of the small-size external additive fine particles and to inhibit migration to members of the large-size external additive fine particles. The ratio of coverage is preferably at least 80%, more preferably at least 95%, and still more preferably 100%.

Control of the ratio of coverage will depend on the method of production, but, for example, the ratio of coverage can be controlled through the amount of addition of the fine particles of the resin A used in the case of production by redispersing the already produced toner base particles in an aqueous medium using, for example, surfactant; mixing a dispersion of resin A fine particles thereinto; and aggregating and attaching the resin A fine particles to the toner base particle surface using an aggregating agent. In addition, in the case of production by the suspension polymerization method, a toner particle 100% covered by the thermoplastic elastomer can also be produced by using a thermoplastic elastomer having hydrophilic group in the polymerizable monomer.

This hydrophilic group is a group selected from, for example, a carboxy group deriving from, e.g., acrylic acid, methacrylic acid, maleic acid, or vinyl acetate; the hydroxyl group; carbonyl group; ester group; and amino group. For example, when an elastomer is used that has a very highly hydrophobic main skeleton, such as a polyolefinic thermoplastic elastomer or a styrenic thermoplastic elastomer, the presence of a hydrophilic group is preferred because this improves the adherence to paper and improves the low-temperature fixability.

Moreover, when, for example, the toner particle is produced in an aqueous medium with dissolution in or addition to and dispersion in oil as in the suspension polymerization method or dissolution suspension method, a hydrophilic group is preferably present, regardless of the type of thermoplastic elastomer, in order to induce segregation to the surface.

The concentration of the hydrophilic group cannot be strictly specified because a favorable range will vary as a function of, for example, the type of thermoplastic elastomer, the affinity with the binder resin, the type of hydrophilic group, and the production method. However, viewed from the standpoints of the low-temperature fixability and controlling the ratio of coverage, the acid value of the thermoplastic elastomer is preferably at least 5.0 mg KOH/g and not more than 120.0 mg KOH/g.

The amount of use of the covering resin cannot be strictly specified because it depends on the production method. Considered with reference to the total mass of the resin A-containing toner particle, it is preferably at least 2.0 mass % and not more than 30.0 mass % and is more preferably at least 3.0 mass % and not more than 20.0 mass %.

The total content of thermoplastic elastomer can be determined using the following procedure. 5 g of the toner particle is dissolved in 100 g of tetrahydrofuran at room temperature and this is allowed to stand for 24 hours. The insoluble component is then separated by filtration. This insoluble fraction is a mixture of the wax, the pigment, a gel fraction originating from the binder resin, the thermoplastic elastomer, and so forth.

This insoluble fraction is then dissolved in toluene heated to around 70° C. and separation by filtration is carried out again. The pigment and gel fraction, which do not dissolve in hot toluene, are separated; the toluene is distilled from the filtrate using, for example, an evaporator; and the solid fraction is dried. The dried solid is dissolved in a solvent capable of dissolving mainly the wax component, e.g., hexane heated to around 60° C., and the insoluble fraction is again separated by filtration and dried to obtain the thermoplastic elastomer. The total content can be determined from the mass of the toner used and the mass of the thermoplastic elastomer extracted by this procedure.

<External Additive Fine Particles>

The toner of the present invention preferably has, on the toner particle surface, fine particles having a number-average particle diameter of at least 0.090 μm (also referred to as the large-size external additive fine particles) because this maintains a high transfer efficiency even after long-term use. The number-average particle diameter is more preferably at least 0.10 μm. The upper limit is preferably not more than 0.30 μm and more preferably not more than 0.20 μm.

When the number-average particle diameter of the large-size external additive fine particles is at least 0.090 μm, the large-size external additive fine particles are resistant to being buried in the toner particle surface by long-term use and the spacer effect can then be satisfactorily exhibited even after long-term use and a high-transfer efficiency can be maintained.

In addition, when the large-size external additive fine particles are held for 24 hours in an environment having a temperature of 23° C. and a relative humidity of 5% followed by holding for 1 hour in an environment having a temperature of 30° C. and a relative humidity of 80%, the value yielded by dividing the resulting percentage mass change for the fine particles by the specific surface area of the fine particles (percentage mass change/specific surface area) is preferably not more than 0.055%·g/m². This is more preferably not more than 0.050%·g/m². While there are no particular limitations on the lower limit, at least 0.025%·g/m² is preferred and at least 0.030%·g/m² is more preferred.

When the percentage mass change/specific surface area is not more than 0.055%·g/m², the occurrence of charge diffusion via the fine particles is impeded and charging can be stabilized in addition to obtaining a satisfactory charge. As a result, a high transfer efficiency can be maintained regardless of the surrounding environment.

The percentage mass change can be controlled, for example, in the case of silica fine particles, using a known hydrophobic treatment, for example, treatment with a silane coupling agent and treatment with a silicone oil. In addition, the specific surface area can be controlled through the primary particle diameter for the fine particles used and through the density of the fine particles.

The following, for example, can be used for the large-size external additive fine particles having a number-average particle diameter of at least 0.090 μm: silica as described above and also alumina, titanium oxide, barium titanate, magnesium titanate, calcium titanate, strontium titanate, zinc oxide, tin oxide, silica sand, clay, mica, wollastonite, diatomaceous earth, chromium oxide, cerium oxide, red iron oxide, antimony trioxide, magnesium oxide, zirconium oxide, barium sulfate, barium carbonate, calcium carbonate, silicon carbide, and silicon nitride. Inclusion of silica is preferred in terms of charging control.

The fine particles can be exemplified by "Sciqas series" silica fine particles (Sakai Chemical Industry Co., Ltd.) and "TG-C190 series" silica fine particles (Cabot Corporation).

Separately from the aforementioned fine particles, a flowability improver having a number-average particle diameter of less than 0.090 μm (also referred to as small-size external additive fine particles) may be externally added to the toner.

For example, silica, titanium oxide, alumina, their composite oxides, and the preceding after a surface treatment can be used as the flowability improver.

When the large-size external additive fine particles having a number-average particle diameter of at least 0.090 μm are used, the ratio of coverage C (%) of the toner particle by the large-size external additive fine particles preferably satisfies the following formula (1). By doing this, migration of the fine particles to members is suppressed and the spacer effect is satisfactorily exhibited on a long-term basis.

$$C > \frac{\sqrt{3}\,\pi}{18} \frac{D_E(D_T + D_E)^2}{D_T^3} \times 100 \qquad (1)$$

In the formula, $D_T$ represents the number-average particle diameter D1 of the toner particle and $D_E$ represents the number-average particle diameter D1 of the fine particles.

FIG. 1 is a projection view that schematically depicts a condition in which a toner particle 1 and a large-size external additive fine particle 2 disposed on the surface of the toner particle 1 are each in contact with the same plane. In this condition, the shaded sector on the surface of the toner particle 1 is not in contact with the plane.

Figure 2:
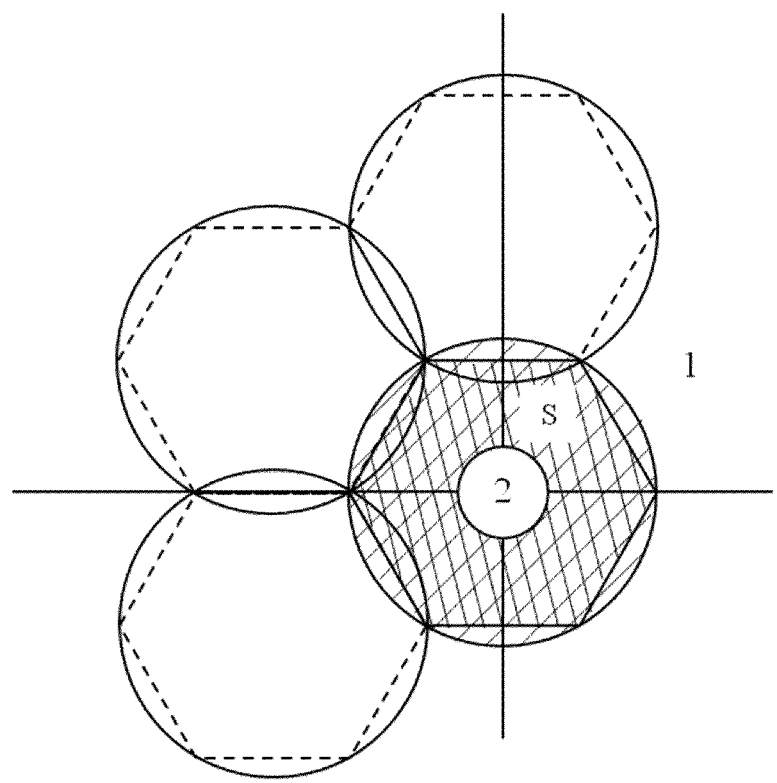
FIG. 2 is a schematic diagram of the disposition of fine particles into a mode whereby the toner particle surface does not contact a plane.

Considering the case in which the surface of the toner particle 1 is completely and exhaustively packed with shaded sectors by arranging large-size external additive fine particles 2 on the surface of the toner particle 1 and the arrangement is made such that the number of large-size external additive fine particles 2 is a minimum, the projection view of this arrangement is then as shown in FIG. 2. However, the toner particle 1 is assumed to be sufficiently larger than the large-size external additive fine particle 2 as to approximately resemble a plane. The area covered by the presence of one particle of the large-size external additive fine particle 2 whereby the surface of the toner particle 1 cannot contact a plane is then represented by the hexagonal crosshatched section S in FIG. 2 and is given by the following formula (2).

$$S = \frac{6\sqrt{3}\,D_T^3 D_E}{(D_T + D_E)^2} \qquad (2)$$

Here, for n large-size external additive fine particles 2 present on the toner surface, the condition where the surface of the toner particle 1 does not contact a plane becomes the following formula (3).

$$\frac{3\sqrt{3}\,D_T^3 D_E}{2(D_T + D_E)^2} \cdot n > \pi D_T^2 \qquad (3)$$

Moreover, modification of formula (3) using the ratio of coverage C of the toner particle 1 by large-size external additive fine particles 2 yields formula (1). The relationship between the number n of large-size external additive fine particles 2 and the ratio of coverage C is the following formula (4).

$$C = \frac{n D_E^2}{4 D_T^2} \times 100 \qquad (4)$$

The toner particle 1 does not contact another plane when the large-size external additive fine particles 2 are present ideally dispersed on the surface of the toner particle 1 at a ratio of coverage that satisfies formula (4). That is, by disposing the large-size external additive fine particles 2 on the surface of the toner particle 1 at a ratio of coverage that satisfies formula (1) and producing a state in which the toner particle does not contact another plane, a high transfer efficiency can be maintained by obtaining a satisfactory spacer effect while suppressing burying of the large-size external additive fine particle 2 in the toner particle 1.

The amount of addition of fine particles having a number-average particle diameter of at least 0.090 μm is preferably at least 0.1 mass parts and not more than 10.0 mass parts per 100.0 mass parts of the toner particle. Mixing of the toner particle with the fine particles can use a known mixer such as a Henschel mixer.

The measurement methods and evaluation methods used in the present invention are described in the following.

The modulus of elasticity of the covering resin for the toner particle surface can be measured as follows.

<Modulus of Elasticity Ea and Modulus of Elasticity Eb>

This evaluation is carried out using a scanning probe microscope (SPM). The modulus of elasticity Ea of the resin A and the modulus of elasticity Eb of the binder resin can be measured by mapping of the modulus of elasticity. The ratio of coverage by the resin A can be determined by discriminating the modulus of elasticity of the resin A from the modulus of elasticity of the binder resin in the mapping of the modulus of elasticity. The specific procedure is as follows.

The toner is embedded in "D-800" visible light-curable embedding resin (Nisshin EM Co., Ltd.) and, using a Leica EM UC7/FC7 (Leica Microsystems) ultramicrotome for normal temperature or frozen section production, smooth cross sections of the embedded sample containing toner particle cross sections and having an arithmetic average roughness for the surface of not more than 100 nm are obtained with the device being held at −80° C. using liquid nitrogen.

Then, using a NanoScope V Dimension Icon (Bruker AXS GmbH) scanning probe microscope (SPM), force curve measurements are carried out in contact mode on a 4.0 μm-square range containing the toner particle surface and the interior region from the surface to 1 μm. Acquisition of the force curve is carried out using 50 nN for the applied load, 0.5 Hz for the scanning rate, and room temperature in the atmosphere for the measurement environment.

The specifications for the cantilever used for the measurement are as follows.
material: silicon
spring constant: 42 (N/m)
tip radius: 10 (nm)

For Ea/Eb and the ratio of coverage (%), measurement is carried out by selecting ten toner particle cross sections falling in the range within the volume-based median diameter ($D_{50V}$)±0.5 μm for the toner particle, and images are obtained that present a clear contrast due to differences in the modulus of elasticity. The average value of the numerical values for these is calculated, throwing out the highest and lowest values.

<Measurement of the Ratio of Coverage by the Covering Resin of the Toner Particle Surface>

The ratio of coverage (%) by the covering resin (resin A) is calculated using the following formula from the aforementioned images presenting a clear contrast due to differences in the modulus of elasticity.

Ratio of coverage (%)=(length of the interface between the toner base particle and the covering layer on the toner particle surface in mapping of the modulus of elasticity)/(length of the perimeter of the toner base particle)×100

<Measurement of the Adhesion Force of Spherical $SiO_2$ with Respect to the Toner Particle>

The adhesion force of spherical $SiO_2$ with respect to the toner particle is measured using a "Nano-IM" scanning probe microscope (Pacific Nanotechnology Inc. (PNI)). For the probe, a colloidal probe (product name: CP-NCH-SiO-A (sQUBE)) having spherical $SiO_2$ attached at the tip and commercially available in a small particle size (2 μm) is used.

The specifications for the cantilever used for the measurement are as follows.
material: nichrome
spring constant: 42 (N/m)
length: 125 μm
oscillation frequency: 320 kHz The measurement is carried out in AC mode. The measurement environment is at room temperature in the atmosphere. The toner particles are mounted on a glass substrate; the colloidal probe is pressed in at 3 μN; and the maximum force applied during retraction is measured.

This same measurement is carried out on ten toner particles having a long diameter of at least $D50_V \times 0.9$ and not more than $D50_V \times 1.1$ using as reference the volume-based median diameter $D50_V$ (μm) of the toner particles, and the average value of the numerical values, excluding the maximum value and minimum value data, is taken to be the adhesion force.

The specific method for providing the toner particles by removing the external additive from the toner can be exemplified by the following.

1) 45 mg of toner is placed in a sample bottle and 10 mL of methanol is added.

2) The external additive is separated by carrying out dispersion for 3 minutes using an "Ultrasonic Dispersion System Tetra 150" (Nikkaki Bios Co., Ltd.), which is an ultrasound disperser with an electrical output of 120 W and equipped with two oscillators (oscillation frequency=50 kHz) disposed such that the phases are displaced by 180°.

3) The toner particles are separated from the external additive by suction filtration (10-μm membrane filter). When the toner contains a magnetic body, a magnet may be placed at the bottom of the sample bottle to immobilize the toner particles and then just the supernatant is separated.

4) 2) and 3) are carried out a total of three times and the obtained toner particles are thoroughly dried with a vacuum dryer (room temperature). In the examples given below, this adhesion force is indicated as the "adhesion force of the toner particle".

<Measurement of the Number-Average Particle Diameter ($D_1$) and Volume-Based Median Diameter ($D_{50V}$) of the Toner Particle>

The number-average particle diameter of the toner particle is determined as follows. A "Coulter Counter Multisizer 3" (registered trademark, Beckman Coulter, Inc.)—a precision particle size distribution measurement instrument operating on the pore electrical resistance method and equipped with a 100 μm aperture tube—is used for the measurement instrument. The accompanying dedicated software, i.e., "Beckman Coulter Multisizer 3 Version 3.51" (Beckman Coulter, Inc.), is used to set the measurement conditions and analyze the measurement data. The measurement is carried out in 25,000 channels for the number of effective measurement channels.

The aqueous electrolyte solution used for the measurements is prepared by dissolving special-grade sodium chloride in deionized water to provide a concentration of approximately 1 mass % and, for example, "ISOTON II" (Beckman Coulter, Inc.) can be used. The dedicated software is configured as follows prior to measurement and analysis.

In the "modify the standard operating method (SOMME)" screen in the dedicated software, the total count number in the control mode is set to 50,000 particles; the number of measurements is set to one time; and the Kd value is set to the value obtained using "standard particle 10.0 µm" (Beckman Coulter, Inc.). The threshold value and noise level are automatically set by pressing the "threshold value/noise level measurement button". In addition, the current is set to 1,600 µA; the gain is set to 2; the electrolyte is set to ISOTON II; and a check is entered for the "post-measurement aperture tube flush".

In the "setting conversion from pulses to particle diameter" screen of the dedicated software, the bin interval is set to logarithmic particle diameter; the particle diameter bin is set to 256 particle diameter bins; and the particle diameter range is set to 2 µm to 60 µm.

The specific measurement procedure is as follows.

(1) Approximately 200 mL of the above-described aqueous electrolyte solution is introduced into a 250-mL roundbottom glass beaker intended for use with the Multisizer 3 and this is placed in the sample stand and counterclockwise stirring with the stirrer rod is carried out at 24 rotations per second. Contamination and air bubbles within the aperture tube are preliminarily removed by the "aperture flush" function of the dedicated software.

(2) Approximately 30 mL of the above-described aqueous electrolyte solution is introduced into a 100-mL flatbottom glass beaker. To this is added as dispersing agent approximately 0.3 mL of a dilution prepared by the approximately three-fold (mass) dilution with deionized water of "Contaminon N" (a 10 mass % aqueous solution of a neutral pH 7 detergent for cleaning precision measurement instrumentation, comprising a nonionic surfactant, an ionic surfactant, and organic builder, Wako Pure Chemical Industries, Ltd.).

(3) An "Ultrasonic Dispersion System Tetra 150" (Nikkaki Bios Co., Ltd.)—which is an ultrasound disperser with an electrical output of 120 W and equipped with two oscillators (oscillation frequency=50 kHz) disposed such that the phases are displaced by 180°—is prepared. Approximately 3.3 L of deionized water is introduced into the water tank of the ultrasound disperser, and approximately 2 mL of Contaminon N is added to this water tank.

(4) The beaker described in (2) is set into the beaker holder opening on the ultrasound disperser and the ultrasound disperser is started. The vertical position of the beaker is adjusted in such a manner that the resonance condition of the surface of the aqueous electrolyte solution within the beaker is at a maximum.

(5) While the aqueous electrolyte solution within the beaker set up according to (4) is being irradiated with ultrasound, approximately 10 mg of the toner particles is added to the aqueous electrolyte solution in small aliquots and dispersion is carried out. The ultrasound dispersion treatment is continued for an additional 60 seconds. The water temperature in the water tank is controlled as appropriate during ultrasound dispersion to be at least 10° C. and not more than 40° C.

(6) Using a pipette, the dispersed toner-containing aqueous electrolyte solution prepared in (5) is dripped into the roundbottom beaker set in the sample stand as described in (1) with adjustment to provide a measurement concentration of approximately 5%. Measurement is then performed until the number of measured particles reaches 50,000.

(7) The measurement data is analyzed by the previously cited dedicated software provided with the instrument and the number-average particle diameter ($D_1$) is calculated. When set to graph/number % with the dedicated software, the "average diameter" on the "analysis/numerical statistical value (arithmetic average)" screen is the number-average particle diameter ($D_1$). When set to graph/volume % with the dedicated software, the "median diameter" on the "analysis/volumetric statistical value (arithmetic average)" screen is the volume-based median diameter ($D_{50V}$).

<Measurement of the Number-Average Particle Diameter (D1) of the Fine Particles>

Using photographs of the toner taken and enlarged using an "S-4800" scanning electron microscope (Hitachi High-Technologies Corporation), the element analysis feature, e.g., XMA, attached to the scanning electron microscope is used to obtain photographs of the element-mapped toner containing the fine particles. At least 100 of the primary particles of the fine particles of at least 0.080 µm attached to the toner surface are measured and the number-average particle diameter (D1) is determined.

<Evaluation of the Hydrophobicity of the Fine Particles>

The percentage mass change in the evaluation of the hydrophobicity of the fine particles is measured using a "Q5000 SA" thermal gravimetric analyzer (TA Instruments).

Approximately 20 mg of the fine particles is placed in the sample pan; programming is entered to bring the chamber internal environment to a temperature of 23° C. and a relative humidity of 5% and hold for 24 hours followed by holding for 1 hour in an environment with a temperature of 30° C. and a relative humidity of 80%; and the measurement is started. ((TGA2−TGA1)/TGA1)×100 is used for the percentage mass change (%) where TGA1 is the mass after the elapse of 24 hours after starting and TGA2 is the mass after the elapse of 1 hour in the environment with a temperature of 30° C. and a relative humidity of 80%. The value of percentage mass change/specific surface area is taken as an index of the hydrophobicity in the present invention where the specific surface area (BET specific surface area) is measured by the BET method using nitrogen adsorption.

The BET specific surface area of the fine particles is measured according to JIS-Z8830 (2001). The specific measurement method is as follows.

A "TriStar 3000" Automatic Specific Surface Area•Porosimetry Analyzer (Shimadzu Corporation), which uses gas adsorption by a constant volume procedure as its measurement methodology, is used as the measurement instrument. The measurement conditions are set and the measurement data is analyzed using "TriStar 3000 Version 4.00", the dedicated software provided with this instrument, and a vacuum pump, nitrogen gas line, and helium gas line are connected to the instrument. The value calculated using a multipoint BET method and using nitrogen gas as the adsorption gas is used as the BET specific surface area in the present invention.

The BET specific surface area is calculated proceeding as follows.

First, nitrogen gas is adsorbed to the fine particles and the equilibration pressure P (Pa) within the sample cell and the amount of nitrogen adsorption Va ($mol \cdot g^{-1}$) by the fine particles are measured at this point. The adsorption isotherm is obtained using the relative pressure Pr—which is the value provided by dividing the equilibration pressure P (Pa) within the sample cell by the saturation vapor pressure Po (Pa) of nitrogen—for the horizontal axis and using the amount of nitrogen adsorption Va (mol·g$^{-1}$) for the vertical axis. The monomolecular layer adsorption amount Vm (mol·g$^{-1}$), which is the amount of adsorption required to form a monomolecular layer on the surface of the fine particles, is then determined using the BET equation provided below.

$$Pr/Va(1-Pr)=1/(Vm\times C)+(C-1)\times Pr/(Vm\times C)$$

(Here, C is the BET parameter and is a variable that changes with the type of measurement sample, the type of adsorption gas, and the adsorption temperature.)

The BET equation can be rendered as a straight line, with a slope of (C−1)/(Vm×C) and an intercept of 1/(Vm×C), by using Pr for the x-axis and Pr/Va(1−Pr) for the y-axis (this straight line is referred to as a BET plot).

$$\text{slope of the straight line}=(C-1)/(Vm\times C)$$

$$\text{intercept of the straight line}=1/(Vm\times C)$$

The value of the slope of this straight line and the value of its intercept can be calculated by plotting the measured values of Pr and the measured values of Pr/Va(1−Pr) on a graph and generating a straight line by the least-squares method. Using these values, Vm and C can be calculated by solving the aforementioned simultaneous equations for the slope and intercept.

The BET specific surface area S (m$^2$·g$^{-1}$) of the fine particles is then calculated using the following equation and the Vm calculated as above and the molecular cross-sectional area of the nitrogen molecule (0.162 nm$^2$): S=Vm× N×0.162×10$^{-18}$ (here, N is Avogadro's number (mol$^{-1}$)).

Measurements using this instrument are run according to the "TriStar 3000 Operating Manual V4.0" provided with the instrument and specifically are run using the following procedure.

The glass sample cell (stem diameter=⅜ inch, volume=approximately 5 mL) provided with the instrument is thoroughly cleaned and dried and then exactly weighed to determine the tare mass. Approximately 1.5 g of the fine particles is introduced into this sample cell using a funnel.

The sample cell loaded with the fine particles is set in a "Vacu-prep 061" pretreatment apparatus (Shimadzu Corporation) connected to a vacuum pump and nitrogen gas line and vacuum degassing is continued for about 10 hours at 23° C. This vacuum degassing is performed by gradually degassing while adjusting the valve in order to avoid suctioning the fine particles into the vacuum pump. The pressure in the cell gradually drops as degassing proceeds and approximately 0.4 Pa (approximately 3 mTorr) is finally reached. After the completion of vacuum degassing, nitrogen gas is gradually introduced to return the interior of the sample cell to atmospheric pressure and the sample cell is removed from the pretreatment apparatus. The mass of this sample cell is exactly weighed and the precise mass of the fine particles is calculated from the difference from the tare mass. The sample cell is closed with a rubber stopper during weighing in order to prevent the particles in the sample cell from being contaminated with, for example, moisture in the atmosphere.

The "isothermal jacket" provided with the instrument is then installed on the stem of this sample cell loaded with the fine particles. The filler rod provided with the instrument is inserted into the sample cell and the sample cell is set in the analysis port of the instrument. This isothermal jacket is a cylindrical element whose inside is composed of a porous material and whose outside is composed of an impermeable material, and it can draw up the liquid nitrogen by capillary phenomena to a prescribed level.

Measurement of the free space in the sample cell including the connection fixtures is then performed. For the free space, the volume of the sample cell is measured at 23° C. using helium gas; then, after the sample cell has been cooled with liquid nitrogen, the volume of the sample cell is similarly measured using helium gas; and the free space is calculated converting from the difference in these volumes. In addition, the saturation vapor pressure Po (Pa) of nitrogen is automatically measured separately using the Po tube built into the instrument.

Then, after the interior of the sample cell has been vacuum degassed, the sample cell is cooled with liquid nitrogen while vacuum degassing is continued. After this, nitrogen gas is admitted in stages into the sample cell and the nitrogen molecules are adsorbed to the fine particles. At this point, the above-described adsorption isotherm is obtained by measurement of the equilibration pressure P (Pa) as required, and this adsorption isotherm is converted to a BET plot. The relative pressure Pr points for data collection are set at a total of six points, i.e., 0.05, 0.10, 0.15, 0.20, 0.25, and 0.30. A straight line is generated by the least-squares method from the obtained measurement data and Vm is calculated from the slope and intercept of this straight line. Using this value of Vm, the BET specific surface area of the fine particles is calculated as described above.

<Ratio of Coverage C (%) of the Toner Particle by the Large-Size External Additive Fine Particles>

This ratio of coverage C is calculated based on the preceding formula (1) for the relationship between the number n of the large-size external additive fine particles and the ratio of coverage C.

<Evaluation of the Toner Collapse Behavior>

The toner collapse behavior is evaluated based on the circularity using an "FPIA-3000" (Sysmex Corporation), a flow-type particle image analyzer.

The specific measurement method is as follows. First, approximately 20 mL of deionized water from which solid impurities and so forth have been preliminarily removed, is introduced into a glass container. To this is added as dispersing agent approximately 0.2 mL of a dilution prepared by the approximately three-fold (mass) dilution with deionized water of "Contaminon N" (a 10 mass % aqueous solution of a neutral pH 7 detergent for cleaning precision measurement instrumentation, comprising a nonionic surfactant, an ionic surfactant, and organic builder, Wako Pure Chemical Industries, Ltd.). Approximately 0.02 g of the measurement sample is added and a dispersion treatment is carried out for 2 minutes using an ultrasound disperser to provide a dispersion to be used for the measurement. Cooling is carried out as appropriate during this process in order to have the temperature of the dispersion be at least 10° C. and not more than 40° C. A benchtop ultrasound cleaner/disperser that has an oscillation frequency of 50 kHz and an electrical output of 150 W (for example, the "VS-150" (Velvo-Clear)) is used as the ultrasound disperser, and a prescribed amount of deionized water is introduced into the water tank and approximately 2 mL of Contaminon N is added to the water tank.

The previously indicated flow particle image analyzer fitted with a "UPlanApro" objective lens (10×, numerical aperture: 0.40) is used for the measurement, and "PSE-900A" (Sysmex Corporation) particle sheath is used for the sheath solution. The dispersion prepared according to the procedure described above is introduced into the flow particle image analyzer and 3,000 of the toner are measured according to total count mode in HPF measurement mode. The circularity of the toner is determined with the binarization threshold value during particle analysis set at 85% and the analyzed particle diameter limited to a circle-equivalent diameter of at least 1.985 μm to less than 39.69 μm.

For this measurement, automatic focal point adjustment is performed prior to the start of the measurement using reference latex particles (for example, a dilution with deionized water of "RESEARCH AND TEST PARTICLES Latex Microsphere Suspensions 5200A", Duke Scientific Corporation). After this, focal point adjustment is preferably performed every two hours after the start of measurement.

The flow-type particle image analyzer used had been calibrated by the Sysmex Corporation and had been issued a calibration certificate by the Sysmex Corporation. The measurements are carried out under the same measurement and analysis conditions as when the calibration certification was received, with the exception that the analyzed particle diameter is limited to a circle-equivalent diameter of at least 1.985 μm to less than 39.69 μm.

The circularity was measured by the aforementioned procedure both before and after long-term use, and the toner collapse behavior was evaluated using the increment ΔC in the numerical proportion of toner having a circularity of not more than 0.9.

The evaluation in long-term use was carried out using a partially modified commercial color laser printer (HP Color LaserJet 3525dn). One modification enabled operation even with the process cartridge for only one color installed. Another modification made the temperature of the fixing unit freely variable.

The toner fill was removed from the black toner process cartridge mounted in this color laser printer; the interior was cleaned with an air blower; and the cyan toner (300 g) was filled into the process cartridge. After being refilled with toner, the process cartridge was mounted in the color laser printer and 3,000 prints were continuously made on the recording medium of a horizontal line image having a print percentage of 1%.

A: ΔC is less than 2%
B: ΔC is at least 2% and less than 5%
C: ΔC is at least 5% and less than 10%
D: ΔC is at least 10%

Evaluation of the Transfer Efficiency

The transfer efficiency is a transferability index that shows what % of the toner developed onto the photosensitive drum is transferred onto the intermediate transfer belt. The transfer efficiency was evaluated by filling the toner into the process cartridge of an "LBP-5050" (Canon, Inc.) full-color printer and continuously forming a solid image on the recording medium. After 3,000 prints of this image had been formed, the toner transferred onto the intermediate transfer belt and the toner also remaining post-transfer on the photosensitive drum were peeled off using a transparent polyester pressure-sensitive tape. The density difference was calculated in each case by subtracting the toner density for only the pressure-sensitive adhesive tape applied to paper from the toner density for the peeled-off pressure-sensitive tape applied to paper. The transfer efficiency is the percentage for the toner density difference for the intermediate transfer belt, where 100 is the sum of the individual toner density differences, and a higher percentage here indicates a better transfer efficiency. Two patterns were used for the measurement environment, i.e., a low-temperature, low-humidity environment (15° C./15% RH) and a high-temperature, high-humidity environment (30° C./80% RH), and the evaluation of the transfer efficiency after producing 3,000 prints of the aforementioned image was scored using the following criteria.

The toner density was measured using an X-Rite color reflection densitometer (500 series).
A: the transfer efficiency is at least 98%
B: the transfer efficiency is at least 95% and less than 98%
C: the transfer efficiency is at least 90% and less than 95%
D: the transfer efficiency is less than 90%

Evaluation of the Low-Temperature Fixability

This evaluation was performed by printing a solid image (toner laid-on level: 0.9 mg/cm$^2$) to the transfer material using an "LBP-5050" full color printer (Canon, Inc.) at different fixation temperatures. The fixation temperature is the value provided by measurement of the fixing film surface using a noncontact thermometer. Letter-size plain paper (XEROX 4200, XEROX Corporation, 75 g/m$^2$) was used for the transfer material. The temperature of offset production on the low temperature side was taken to be the minimum fixation temperature (MFT).

EXAMPLES

Examples of the application of the present invention are described below; however, their features are not limitations on the scope of the present invention. Unless specifically indicated otherwise, the parts and % in the following blends are each on a mass basis.

Toner Particle a Production Example

Step of Preparing a Polymerizable Monomer Composition

| | |
|---|---|
| styrene | 82.0 parts |
| butyl acrylate | 18.0 parts |
| divinylbenzene | 0.1 parts |
| C.I. Pigment Blue 15:3 | 5.5 parts |
| maleic acid-modified styrenic elastomer M1913 (acid value = 10.0 mg KOH/g, Asahi Kasei Chemicals Corporation) | 6.0 parts |

These materials were mixed and subsequently dispersed for 3 hours using a ball mill. The obtained dispersion was transferred to a reactor equipped with propeller stirring blades; heating was carried out to 60° C. while stirring at 300 rpm; and 12.0 parts of an ester wax (peak temperature of maximum endothermic peak in DSC measurement=70° C., number-average molecular weight (Mn)=704) and 3.0 parts of 2,2'-azobis(2,4-dimethylvaleronitrile) were then added with dissolution to prepare a polymerizable monomer composition.

Step of Preparing a Dispersion Stabilizer 710 parts of deionized water and 450 parts of a 0.1 mol/L aqueous sodium phosphate solution were added to a 2 L four-neck flask fitted with a T. K. Homomixer high-speed stirrer (Primix Corporation) and were heated to 60° C. while stirring at 12,000 rpm. To this was added 68.0 parts of a 1.0 mol/L aqueous calcium chloride solution to prepare an aqueous dispersion medium containing calcium phosphate as a sparingly water-soluble dispersion stabilizer.

Granulation•Polymerization Step 290 parts of the polymerizable monomer composition was introduced into the aforementioned aqueous dispersion medium and granulation was carried out for 15 minutes while maintaining a rotation rate of 12,000 rpm. The high-speed stirrer was then replaced with a stirrer equipped with a propeller stirring blade; polymerization was continued for 5 hours at an internal temperature of 60° C.; and the interior temperature was subsequently raised to 80° C. and polymerization was continued for another 3 hours. After the completion of the polymerization reaction, the residual monomer was distilled out at 80° C. under reduced pressure, followed by cooling to normal temperature to obtain a dispersion of polymer fine particles.

Washing•Drying Step

The dispersion of polymer fine particles was transferred to a washing vessel and dilute hydrochloric acid was added while stirring and the pH was adjusted to 1.5. After the dispersion had been stirred for 2 hours, solid-liquid separation was carried out using a filter to obtain polymer fine particles. These were introduced into 1,200 parts of deionized water and stirring was carried out to obtain another dispersion; this was followed by solid-liquid separation using a filter. This process was carried out three times, and a toner particle a was obtained by thorough drying in a 30° C. dryer. At this point, the number-average particle diameter $D_1$ of the toner particle a was 6.0 μm. Otherwise, the results of measurement of Ea/Eb×100 and $A_T$ for toner particle a are given in Table 1.

Toner Particle b Production Example

Step of Producing Toner Base Particle b

A toner base particle b was obtained by the same procedure as for the toner particle a, but using an amorphous polyester resin 1 (polycondensate of ethylene oxide-modified bisphenol A and terephthalic acid, glass transition temperature=62° C., weight-average molecular weight (Mw)=9,000, number-average molecular weight (Mn)=4,000, acid value=10.0 mg KOH/g) in place of the maleic acid-modified styrenic elastomer M1913. The number-average particle diameter D1 of this toner base particle b was 5.5 μm.

Step of Producing an Aqueous Dispersion of the Covering Resin

| | |
|---|---|
| maleic acid-modified elastomer M1943 (acid value = 10.0 mg KOH/g, Asahi Kasei Chemicals Corporation) | 6.0 parts |
| tetrahydrofuran (THF) | 8.0 parts |
| anionic surfactant (Neogen RK, DKS Co. Ltd.) | 0.2 parts |

These materials were mixed followed by the gradual dropwise addition, while vigorously stirring at room temperature, of 100.0 parts of an aqueous solution having a pH adjusted to 11.5 and prepared by the addition of sodium hydroxide to pure water. The THF was distilled off from the obtained dispersion at 50° C. under reduced pressure to obtain an aqueous dispersion of a covering resin. The solids concentration in the aqueous dispersion of the covering resin was 2.0 mass %, and the number-average particle diameter provided using a Nanotrac dynamic light-scattering particle size distribution analyzer (Nikkiso Co., Ltd.) was 0.065 μm.

Step of Covering with a Shell

The toner base particle b was transferred into an aqueous anionic surfactant solution and was dispersed to obtain an aqueous dispersion having a solids concentration of 5.0 mass %. To each 100.0 parts of the solids in the prepared dispersion was added 12.5 parts of the aqueous dispersion of the covering resin with stirring. A covering layer was formed by the covering resin on the surface of the toner base particle b by adjusting the pH to 0.95 by the dropwise addition of dilute hydrochloric acid while stirring. After this, the surface was smoothed out by subjecting the suspension containing the covering resin-covered toner base particle b to a treatment for 2 hours at 90° C.

Washing•Drying Step

The water was filtered from this dispersion on a filter followed by introduction into 1,200 parts of deionized water and stirring to reproduce a dispersion and then solid-liquid separation using a filter. After this process had been carried out three times, the particles yielded by the final solid-liquid separation were thoroughly dried using a 30° C. dryer to obtain toner particle b. At this point, the number-average particle diameter $D_1$ of the toner particle b was 5.5 μm. Otherwise, the results of measurement of Ea/Eb×100 and $A_T$ for toner particle b are given in Table 1.

Toner Particle c Production Example

Step of Producing Toner Base Particle c

A toner base particle c was obtained by the same procedure as for the toner particle a, but using the amorphous polyester resin 1 (polycondensate of ethylene oxide-modified bisphenol A and terephthalic acid, glass transition temperature=62° C., weight-average molecular weight (Mw)=9,000, number-average molecular weight (Mn)=4,000, acid value=10.0 mg KOH/g) in place of the maleic acid-modified styrenic elastomer M1913. The number-average particle diameter $D_1$ of this toner base particle c was 5.4 μm.

Step of Producing an Aqueous Dispersion of the Covering Resin

| | |
|---|---|
| maleic acid-modified elastomer M1913 (acid value = 10.0 mg KOH/g, Asahi Kasei Chemicals Corporation) | 6.0 parts |
| tetrahydrofuran (THF) | 8.0 parts |
| anionic surfactant (Neogen RK, DKS Co. Ltd.) | 0.2 parts |

These materials were mixed followed by the gradual dropwise addition, while vigorously stirring at room temperature, of 100.0 parts of an aqueous solution having a pH adjusted to 11.5 and prepared by the addition of sodium hydroxide to pure water. The THF was distilled off from the obtained dispersion at 50° C. under reduced pressure to obtain an aqueous dispersion of a covering resin. The solids concentration in the aqueous dispersion of the covering resin was 3.0 mass %, and the number-average particle diameter provided using a Nanotrac dynamic light-scattering particle size distribution analyzer (Nikkiso Co., Ltd.) was 0.065 μm.

Step of Covering with a Shell

The toner base particle c was transferred into an aqueous anionic surfactant solution and was dispersed to obtain an aqueous dispersion having a solids concentration of 5.0 mass %. To each 100.0 parts of the solids in the prepared dispersion was added 12.5 parts of the aqueous dispersion of the covering resin with stirring. A covering layer was formed by the covering resin on the surface of the toner base particle c by adjusting the pH to 0.95 by the dropwise addition of dilute hydrochloric acid while stirring. After this, the surface was smoothed out by subjecting the suspension containing the covering resin-covered toner base particle c to a treatment for 2 hours at 90° C.

Washing•Drying Step

The water was filtered from this suspension on a filter followed by introduction into 1,200 parts of deionized water and stirring to reproduce a dispersion and then solid-liquid separation using a filter. After this process had been carried out three times, the particles yielded by the final solid-liquid separation were thoroughly dried using a 30° C. dryer to obtain toner particle c. At this point, the number-average particle diameter $D_1$ of the toner particle c was 5.4 µm. Otherwise, the results of measurement of Ea/Eb×100 and $A_T$ for toner particle c are given in Table 1.

Toner Particle d Production Example

The toner particle d was obtained by the same procedure as for toner particle a, but changing the M1913 to M1943 (acid value=10.0 mg KOH/g, Asahi Kasei Chemicals Corporation). The number-average particle diameter $D_1$ of toner particle d was 5.4 µm.

Otherwise, the results of measurement of Ea/Eb×100 and $A_T$ for toner particle d are given in Table 1.

Toner Particle e Production Example

The toner particle e was obtained by the same procedure as for toner particle d, but changing the number of parts of addition of M1943 to 20.0 parts. The number-average particle diameter D1 of toner particle e was 6.5 µm. Otherwise, the results of measurement of Ea/Eb×100 and $A_T$ for toner particle e are given in Table 1.

Toner Particle f Production Example

The toner particle f was obtained by the same procedure as for toner particle a, but changing the M1913 to the acrylic acid-modified olefinic elastomer N1035 (acid value=80.0 mg KOH/g, Du Pont-Mitsui Polychemicals Co., Ltd.). The number-average particle diameter $D_1$ of toner particle f was 5.5 µm.

Otherwise, the results of measurement of Ea/Eb×100 and $A_T$ for toner particle f are given in Table 1.

Toner Particle g Production Example

The toner particle g was obtained by the same procedure as for toner particle a, but changing the M1913 to the acrylic acid-modified olefinic elastomer N410 (acid value=72.0 mg KOH/g, Du Pont-Mitsui Polychemicals Co., Ltd.). The number-average particle diameter $D_1$ of toner particle g was 5.6 µm.

Otherwise, the results of measurement of Ea/Eb×100 and $A_T$ for toner particle g are given in Table 1.

Toner Particle h Production Example

The toner particle h having the amorphous polyester 1 on the surface was obtained by the same procedure as for toner particle a, but changing the M1913 to the amorphous polyester resin 1 (polycondensate of ethylene oxide-modified bisphenol A and terephthalic acid, glass transition temperature=62° C., weight-average molecular weight (Mw)=9,000, number-average molecular weight (Mn)=4,000, acid value=10.0 mg KOH/g). The number-average particle diameter $D_1$ of toner particle h was 5.8 µm.

Otherwise, the results of measurement of Ea/Eb×100 and $A_T$ for toner particle h are given in Table 1.

Toner Particle i Production Example

The toner particle i was obtained by the same procedure as for toner particle a, but using the acrylic acid-modified olefinic elastomer AN42012C (acid value=72.0 mg KOH/g, Du Pont-Mitsui Polychemicals Co., Ltd.) in place of the M1913. The number-average particle diameter D1 of toner particle i was 5.5 µm. Otherwise, the results of measurement of Ea/Eb×100 and $A_T$ for toner particle i are given in Table 1.

Toner Particle j Production Example

The toner particle j was obtained by the same procedure as for toner particle a, but using the combination of 4 parts of M1943 and 2 parts of the styrene/isoprene thermoplastic elastomer SIS5229 (acid value=0, JSR Corporation) as the covering resin in place of the M1913. The number-average particle diameter $D_1$ of toner particle j was 5.7 µm. Otherwise, the results of measurement of Ea/Eb×100 and $A_T$ for toner particle j are given in Table 1.

Toner Particle k Production Example

The toner particle k was obtained by the same procedure as for toner particle b, but changing the covering resin to N410 (acid value=72.0 mg KOH/g, Du Pont-Mitsui Polychemicals Co., Ltd.). The number-average particle diameter ($D_1$) of toner particle k was 5.5 µm. Otherwise, the results of measurement of Ea/Eb×100 and $A_T$ for toner particle k are given in Table 1.

Toner Particle l Production Example

Step of Producing an Aqueous Dispersion of the Covering Resin

| | |
|---|---|
| cyclic olefinic polymer (TOPAS (TM), Polyplastics Co., Ltd.) | 8.1 parts |
| polyethylene resin (Excellen FX351, Sumitomo Chemical Co., Ltd.) | 2.7 parts |
| xylene | 32.4 parts |
| anionic surfactant (Nonsoul LN1, DKS Co. Ltd.) | 0.8 parts |
| deionized water | 100.0 parts |

An oil phase was prepared by mixing the xylene with the polyethylene resin and resin including the cyclic olefinic polymer in a heated 80° C. environment to effect dissolution, and an aqueous phase was prepared by mixing the deionized water with the anionic surfactant to effect dissolution. The oil phase and aqueous phase were mixed and stirring was carried out for approximately 30 minutes in a heated 80° C. environment at 8,000 to 9,000 rpm using a Robomix from the Primix Corporation to produce an oil droplet-in-water emulsion in which the size of the oil phase was approximately 1 µm.

The obtained emulsion was heated to 80° C. and was treated approximately three times with a Star Burst from Sugino Machine Limited to produce an aqueous dispersion having an oil phase size of approximately 100 nm.

The xylene was distilled off from the obtained aqueous dispersion under reduced pressure at 50° C. to obtain an aqueous dispersion of the covering resin. The solids concentration in the aqueous dispersion of the covering resin was 9.3 mass %, and the number-average particle diameter provided using a Nanotrac dynamic light-scattering particle size distribution analyzer (Nikkiso Co., Ltd.) was 0.080 µm.

Step of Covering with a Shell

The toner base particle c was transferred into an aqueous anionic surfactant solution and was dispersed to obtain an aqueous dispersion having a solids concentration of 5.0 mass %. To each 100.0 parts of the solids in the prepared dispersion was added 12.5 parts of the aqueous dispersion of the covering resin with stirring. A covering layer was formed by the covering resin on the surface of the toner base particle c by adjusting the pH to 0.95 by the dropwise addition of dilute hydrochloric acid while stirring. After this, the toner particle surface was smoothed out by subjecting the suspension containing the covering resin-covered toner base particle c to a treatment for 2 hours at 95° C.

Washing·Drying Step

The water was filtered from this toner particle dispersion on a filter followed by introduction into 1,200 parts of deionized water and stirring to reproduce a dispersion and then solid-liquid separation using a filter. After this process had been carried out three times, the toner particles yielded by the final solid-liquid separation were thoroughly dried using a 30° C. dryer to obtain toner particle 1. At this point, the number-average particle diameter $D_1$ of the toner particle 1 was 5.7 μm. Otherwise, the results of measurement of Ea/Eb×100 and $A_T$ for toner particle 1 are given in Table 1.

Example 1

Step of Attaching a Flowability Improver 1.0 parts of silica fine particles (silica having a number-average primary particle diameter of 0.007 μm) that had been subjected to a surface treatment with hexamethyldisilazane was dry-mixed with 100.0 parts of toner particle a for 5 minutes using a Henschel mixer (Nippon Coke & Engineering Co., Ltd.) to obtain a toner A having $D_1$=6.0 μm and $D_{50V}$=8.0 μm.

Example 2

A toner B having $D_1$=5.5 μm and $D_{50V}$=7.5 μm was obtained by the same method as in Example 1, but using toner particle b.

Example 3

A toner C having $D_1$=5.4 μm and $D_{50V}$=7.1 μm was obtained by the same method as in Example 1, but using toner particle c.

Example 4

Step of Attaching Large-Size External Additive Fine Particles 0.05 parts of a large-size external additive fine particle A (silica having a number-average primary particle diameter of 0.080 μm and a percentage mass change/specific surface area=0.062%·g/m$^2$) was added to 100.0 parts of toner particle d and dry mixing and stirring were carried out for 5 minutes using a Henschel mixer.

Step of Attaching a Flowability Improver 1.00 parts of silica fine particles (silica having a number-average primary particle diameter of 0.007 μm) that had been subjected to a surface treatment with hexamethyldisilazane was also dry-mixed with 100.0 parts of toner particle d for 5 minutes using a Henschel mixer to obtain a toner D having $D_1$=5.4 μm and $D_{50V}$=7.0 μm.

Example 5

Step of Attaching Large-Size External Additive Fine Particles 0.70 parts of a large-size external additive fine particle B (silica having a number-average primary particle diameter of 0.080 μm and a percentage mass change/specific surface area=0.051%·g/m$^2$) was added to 100.0 parts of toner particle d and dry mixing and stirring were carried out for 5 minutes using a Henschel mixer.

Step of Attaching a Flowability Improver 1.00 parts of silica fine particles (silica having a number-average primary particle diameter of 0.007 μm) that had been subjected to a surface treatment with hexamethyldisilazane was also dry-mixed with 100.0 parts of toner particle d for 5 minutes using a Henschel mixer to obtain a toner E having $D_1$=5.4 μm and $D_{50V}$=6.9 μm.

Example 6

Step of Attaching Large-Size External Additive Fine Particles 0.05 parts of a large-size external additive fine particle C (silica having a number-average primary particle diameter of 0.090 μm and a percentage mass change/specific surface area=0.051%·g/m$^2$) was added to 100.0 parts of toner particle d and dry mixing and stirring were carried out for 5 minutes using a Henschel mixer.

Step of Attaching a Flowability Improver 1.00 parts of silica fine particles (silica having a number-average primary particle diameter of 0.007 μm) that had been subjected to a surface treatment with hexamethyldisilazane was also dry-mixed with 100.0 parts of toner particle d for 5 minutes using a Henschel mixer to obtain a toner F having $D_1$=5.4 μm and $D_{50V}$=7.0 μm.

Example 7

Step of Attaching Large-Size External Additive Fine Particles 1.00 parts of a large-size external additive fine particle D (silica having a number-average primary particle diameter of 0.100 μm and a percentage mass change/specific surface area=0.051%·g/m$^2$) was added to 100.0 parts of toner particle d and dry mixing and stirring were carried out for 5 minutes using a Henschel mixer.

Step of Attaching a Flowability Improver 1.00 parts of silica fine particles (silica having a number-average primary particle diameter of 0.007 μm) that had been subjected to a surface treatment with hexamethyldisilazane was also dry-mixed with 100.0 parts of toner particle d for 5 minutes using a Henschel mixer to obtain a toner G having $D_1$=5.4 μm and $D_{50V}$=7.1 μm.

Example 8

Step of Attaching Large-Size External Additive Fine Particles 1.00 parts of the large-size external additive fine particle D (silica having a number-average primary particle diameter of 0.100 μm and a percentage mass change/specific surface area=0.051%·g/m$^2$) was added to 100.0 parts of toner particle e and dry mixing and stirring were carried out for 5 minutes using a Henschel mixer.

Step of Attaching a Flowability Improver 1.00 parts of silica fine particles (silica having a number-average primary particle diameter of 0.007 μm) that had been subjected to a surface treatment with hexamethyldisilazane was also dry-mixed with 100.0 parts of toner particle e for 5 minutes using a Henschel mixer to obtain a toner H having $D_1$=6.5 μm and $D_{50V}$=8.1 μm.

Example 9

A toner I having $D_1$=5.5 μm and $D_{50V}$=7.6 μm was obtained by the same procedure as in Example 8, but adding 1.00 parts of the large-size external additive fine particle D (silica having a number-average primary particle diameter of 0.100 μm and a percentage mass change/specific surface area=0.051%·g/m$^2$) to 100.0 parts of toner particle f.

Example 10

A toner J having $D_1$=5.6 μm and $D_{50V}$=7.3 μm was obtained by the same procedure as in Example 8, but using toner particle g in place of toner particle e.

Comparative Example 1

A toner K having a number-average particle diameter $D_1$=5.8 μm and $D_{50V}$=7.2 μm was obtained by the same procedure as in Example 8, but using toner particle h in place of toner particle e.

Comparative Example 2

A toner L having a number-average particle diameter $D_1$=5.5 μm and $D_{50V}$=7.6 μm was obtained by the same procedure as in Example 8, but using toner particle i in place of toner particle e.

Comparative Example 3

A toner M having a number-average particle diameter $D_1$=5.7 μm and $D_{50V}$=7.4 μm was obtained by the same procedure as in Example 9, but using toner particle j in place of toner particle f.

Comparative Example 4

A toner N having a number-average particle diameter $D_1$=5.5 μm and $D_{50V}$=7.2 μm was obtained by the same procedure as in Example 9, but using toner particle k in place of toner particle f.

Comparative Example 5

A toner O having a number-average particle diameter $D1$=5.7 μm and $D_{50V}$=7.2 μm was obtained by the same procedure as in Example 9, but using toner particle l in place of toner particle f.

Using the toners produced as described above, the change ΔC in the collapse percentage, the transfer efficiency, and the minimum fixation temperature (MFT) were measured on the toners. The results are given in Table 2.

TABLE 1

| Toner particle No. | a | b | c | d | e | f | g | h | i | j | k | l |
|---|---|---|---|---|---|---|---|---|---|---|---|---|
| Classification of thermoplastic elastomer | Styrenic | Styrenic | Styrenic | Styrenic | Styrenic | Olefinic | Olefinic | — | Olefinic | Styrenic | Olefinic | Olefinic |
| Ea/Eb × 100 [%] | 9.8 | 9.8 | 9.8 | 1.5 | 1.5 | 20.0 | 42 | 110 | 91 | 0.4 | 42 | 15 |
| Ratio of coverage by resin A [%] | 100 | 65 | 85 | 100 | 100 | 100 | 100 | 0 | 100 | 100 | 54 | 71 |
| Adhesion force $A_T$ of the toner particle [nN] | 710 | 520 | 590 | 1400 | 1400 | 620 | 610 | 420 | 410 | 1850 | 450 | 430 |
| $D_1$ [μm] | 6.0 | 5.5 | 5.4 | 5.4 | 6.5 | 5.5 | 5.6 | 5.8 | 5.5 | 5.7 | 5.5 | 5.7 |

TABLE 2

| | Example No. | | | | | | | |
|---|---|---|---|---|---|---|---|---|
| | 1 | 2 | 3 | 4 | 5 | 6 | 7 | 8 |
| Toner | A | B | C | D | E | F | G | H |
| Toner particle | a | b | c | d | d | d | d | e |
| D1 of the toner [μm] | 6.0 | 5.5 | 5.4 | 5.4 | 5.4 | 5.4 | 5.4 | 6.5 |
| D1 of the fine particles [μm] | — | — | — | 0.08 | 0.08 | 0.09 | 0.10 | 0.10 |
| Ratio of coverage C by the fine particles [%] | — | — | — | 0.4 | 8.4 | 0.4 | 7.3 | 8.1 |
| Is formula (1) satisfied? | — | — | — | No | Yes | No | Yes | Yes |
| Fine particles (percentage mass change/specific surface area) [%·g/m$^2$] | — | — | — | 0.062 | 0.051 | 0.051 | 0.051 | 0.051 |
| Collapse behavior ΔC [%] | B 4.5 | A 1.8 | A 1.1 | A <1.0 | A <1.0 | A <1.0 | A <1.0 | A <1.0 |
| Transfer efficiency after durability test (low-temperature, low-humidity) [%] | B 95.4 | B 95.7 | B 95.6 | B 96.2 | B 96.2 | B 95.9 | A 99.0< | A 98.0 |
| Transfer efficiency after durability test (high-temperature, high-humidity) [%] | C 90.4 | C 90.5 | C 91.2 | C 93.2 | B 95.9 | B 95.1 | A 99.0< | A 98.2 |

TABLE 2-continued

| | | | | | | | |
|---|---|---|---|---|---|---|---|
| Minimum fixation temperature [° C.] | 165 | 165 | 165 | 165 | 165 | 165 | 165 | 165 |

| | Example No. | | | | | | |
|---|---|---|---|---|---|---|---|
| | 9 | 10 | Comparative 1 | Comparative 2 | Comparative 3 | Comparative 4 | Comparative 5 |
| Toner | I | J | K | L | M | N | O |
| Toner particle | f | g | h | i | j | k | l |
| D1 of the toner [μm] | 5.5 | 5.6 | 5.8 | 5.5 | 5.7 | 5.5 | 5.7 |
| D1 of the fine particles [μm] | 0.10 | 0.10 | 0.10 | 0.10 | 0.10 | 0.10 | 0.10 |
| Ratio of coverage C by the fine particles [%] | 6.9 | 7.0 | 7.3 | 6.9 | 7.1 | 6.9 | 7.1 |
| Is formula (1) satisfied? | Yes | Yes | Yes | Yes | Yes | Yes | Yes |
| Fine particles (percentage mass change/specific surface area) [% · g/m$^2$] | 0.051 | 0.051 | 0.051 | 0.051 | 0.051 | 0.051 | 0.051 |
| Collapse behavior Δ C [%] | A <1.0 | A <1.0 | D 25.0 | D 10.5 | C 8.0 | C 6.5 | C 5.1 |
| Transfer efficiency after durability test (low-temperature, low-humidity) [%] | A 99.0< | A 99.0< | D 87.5 | D 89.1 | C 92.3 | C 94.6 | B 95.1 |
| Transfer efficiency after durability test (high-temperature, high-humidity) [%] | A 99.0< | A 99.0< | D 85.9 | D 89.2 | C 91.9 | C 93.9 | C 94.8 |
| Minimum fixation temperature [° C.] | 160 | 160 | 165 | 160 | 165 | 160 | 165 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-228880, filed Nov. 25, 2016, and Japanese Patent Application No. 2017-202917, filed Oct. 19, 2017, which are hereby incorporated by reference herein in their entirety.

What is claimed is:

1. A toner comprising a toner particle including:
   a toner base particle containing a binder resin, the binder resin being a vinyl resin, a polyester resin, or a hybrid resin provided by their bonding; and
   a covering layer on the surface of the toner base particle, said covering layer containing a resin A, wherein
   resin A is a polyolefinic thermoplastic elastomer having a hydrophilic group, and is present at the surface of the toner particle,
   the modulus of elasticity Ea of the resin A and the modulus of elasticity Eb of the binder resin satisfy 0.5≤(Ea/Eb)×100[%]≤50.0, and
   the adhesion force $A_T$ of the toner particle is at least 500 nN when a probe having spherical $SiO_2$ attached at the tip of a cantilever is pressed into the toner particle at 3 μN.

2. The toner according to claim 1, wherein the ratio of coverage of the toner particle surface by the resin A is at least 70%.

3. The toner according to claim 1, wherein the $A_T$ is at least 600 nN, and
   the toner comprises fine particles on the surface of the toner particle, the fine particles satisfying specifications i) and ii):
   i) the number-average particle diameter of the fine particles is at least 0.090 μm; and
   ii) the ratio of coverage C (%) of the toner particle by the fine particles satisfies formula (1)

$$C > \frac{\sqrt{3}\,\pi}{18} \frac{D_E(D_T + D_E)^2}{D_T^3} \times 100 \quad (1)$$

where $D_T$ represents the number-average particle diameter D1 (μm) of the toner particle and $D_E$ represents the number-average particle diameter D1 (μm) of the fine particles.

4. The toner according to claim 3, wherein a value (percentage mass change/specific surface area) obtained by dividing the percentage mass change for the fine particles by the specific surface area of the fine particles is not more than 0.055%·g/m$^2$, wherein the percentage mass change is obtained when the fine particles are held for 24 hours in an environment having a temperature of 23° C. and a relative humidity of 5% followed by holding for 1 hour in an environment having a temperature of 30° C. and a relative humidity of 80%.

* * * * *